US009866548B2

(12) United States Patent
Shih

(10) Patent No.: US 9,866,548 B2
(45) Date of Patent: Jan. 9, 2018

(54) AUTHENTICATION-FREE CONFIGURATION FOR SERVICE CONTROLLERS

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 21 days.

(21) Appl. No.: 14/686,325

(22) Filed: Apr. 14, 2015

(65) Prior Publication Data

US 2016/0182484 A1    Jun. 23, 2016

Related U.S. Application Data

(60) Provisional application No. 62/093,290, filed on Dec. 17, 2014.

(51) Int. Cl.
*G06F 7/04* (2006.01)
*H04L 29/06* (2006.01)
*H04L 29/08* (2006.01)

(52) U.S. Cl.
CPC ............ *H04L 63/083* (2013.01); *H04L 63/18* (2013.01); *H04L 67/14* (2013.01)

(58) Field of Classification Search
CPC ........ H04L 63/083; H04L 63/18; H04L 67/14
USPC ............................................................ 726/6
See application file for complete search history.

(56) References Cited

U.S. PATENT DOCUMENTS

| 8,032,745 | B2* | 10/2011 | Bandholz | G06F 21/85 713/164 |
| 9,575,925 | B2* | 2/2017 | Tung | G06F 13/4291 |
| 9,678,552 | B2* | 6/2017 | Ahmed | G06F 1/266 |
| 2011/0107079 | A1 | 5/2011 | Minami et al. | |
| 2014/0044265 | A1 | 2/2014 | Kocher et al. | |
| 2015/0086017 | A1* | 3/2015 | Taylor | H04W 12/04 380/270 |
| 2015/0089221 | A1* | 3/2015 | Taylor | H04W 12/08 713/168 |
| 2015/0199289 | A1* | 7/2015 | Tung | G06F 13/4291 710/316 |
| 2015/0248315 | A1* | 9/2015 | Ragupathi | H04L 41/0806 709/226 |
| 2016/0182130 | A1* | 6/2016 | Ahmed | H04B 5/0081 455/41.1 |

(Continued)

FOREIGN PATENT DOCUMENTS

| CN | 1988438 A | 6/2007 |
| TW | 561369 B | 11/2003 |
| TW | 200833056 A | 8/2008 |

OTHER PUBLICATIONS

Taiwanese Office Action for Application No. 104125260, dated Apr. 25, 2017, w/ First Office Action Summary.

*Primary Examiner* — Samson Lemma
(74) *Attorney, Agent, or Firm* — Nixon Peabody LLP; Eduardo J. Quinones; Zhou Lu

(57) ABSTRACT

Embodiments generally relate to out-of-band management of a computing system. The present technology discloses enable a primary service controller to provide a centralized configuration of multiple secondary service controllers so that they can share a same configuration. It can utilize an authentication-free protocol to modify and manage credentials for a large number of service controllers.

13 Claims, 6 Drawing Sheets

(56) References Cited

U.S. PATENT DOCUMENTS

2016/0182469 A1* 6/2016 Ahmed ............... H04L 63/0492
380/270
2017/0142769 A1* 5/2017 Gilbert ................ H04W 76/025
2017/0180206 A1* 6/2017 Ahmed ................... H04L 41/12

* cited by examiner

AUTHENTICATION-FREE CONFIGURATION FOR SERVICE CONTROLLERS

RELATED APPLICATIONS

This application claims priority to U.S. Provisional Application No. 62/093,290, filed Dec. 17, 2014, and entitled "Rack Based Password and Its Delivery Path", the contents of which are hereby incorporated herein by reference in its entirety for all purposes.

FIELD OF THE INVENTION

The disclosure relates generally to out-of-band management of a computing system.

BACKGROUND

Remote server management in a high-density server system is important but remains challenging. For example, a data center often has a complex network topology. It generally comprises a large number of racks that each can support numerous servers, in which each server comprises its independent CPU, network interface, or operation system.

Accordingly, a server management system requires an efficient and reliable management protocol that can not only handle high-bandwidth data transmission but also meet the security requirements of the network.

SUMMARY

Aspects of the present technology disclose techniques that enable efficient out-of-band server management using a rack-based credential (e.g., log-in information such as a user name and a password) configuration for service controllers within a rack. According to some embodiments, the credential configuration can be rack-based or chassis-based; according to some embodiments, the credential configuration can be client-based or multi-factor-based.

According to some embodiments, the present technology can use an authentication-free protocol (e.g., I2C) to modify various types of configurations of a group of service controllers. The various types of configurations comprise a credential configuration, a network configuration, or other functional configuration associated with node management functions of a service controller.

According to some embodiments, the present technology can enable a primary service controller (e.g., a Rack Management Controller (RMC), a Chassis Management Controller (CMC), or a Data Center Management Controller) to provide a centralized configuration of multiple secondary service controllers (e.g., a Baseboard Management Controller (BMC)) so that they can share a same user name and password. It can provide an efficient credential management for a server management device because it can communicate with these secondary service controllers with the same credential.

For example, the present technology can enable a primary service controller to transmit a new configuration (e.g., a user name and a password) to multiple secondary service controllers using Intelligent Platform Management Interface (IPMI) messages by a trusted and authentication-free system bus, such as Inter-Integrated Circuit (I2C). Unlike Remote Management Control Protocol (RMCP) over Local Area Network (LAN), IPMI over I2C is intended for trusted internal communications and does not require authentication. Accordingly, the default configuration of the secondary service controllers can be modified without a complex authentication process that can result in verification delays.

According to some embodiments, in a rack-based credential configuration, a primary service controller can provide one credential to all secondary service controllers within a rack. For example, a RMC of a rack can assign the same user name and password to all BMCs within the rack. Similarly, a primary service controller can provide a new configuration to all secondary service controllers within a rack.

According to some embodiments, a primary service controller can provide a new credential to a selected group of secondary service controllers based on various segmentation factors or data. The selected group of secondary service controllers can be within the same rack or across multiple racks. Similarly, a primary service controller can provide a new configuration to a selected group of secondary service controllers based on various segmentation factors or data.

Additionally, a server management device can transmit a new credential or a new configuration to a primary service controller using Remote Management Control Protocol (RMCP) or RMCP+ by a network, such as LAN. RMCP+ is a UDP-based protocol with stronger authentication than RMCP. Additionally, a server management device can transmit the new credential or the new configuration to a switch that can transmit it to the primary service controller.

Although many of the examples herein are described with reference to LAN and I2C, it should be understood that these are only examples and the present technology is not limited in this regard. Rather, any protocols that provide connections between computer components may be used.

Additionally, even though the present discussion uses a RMC and a BMC as examples of a service controller, the present technology is applicable to other service controller that is independent from the main CPU and operation system.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Figure 1:
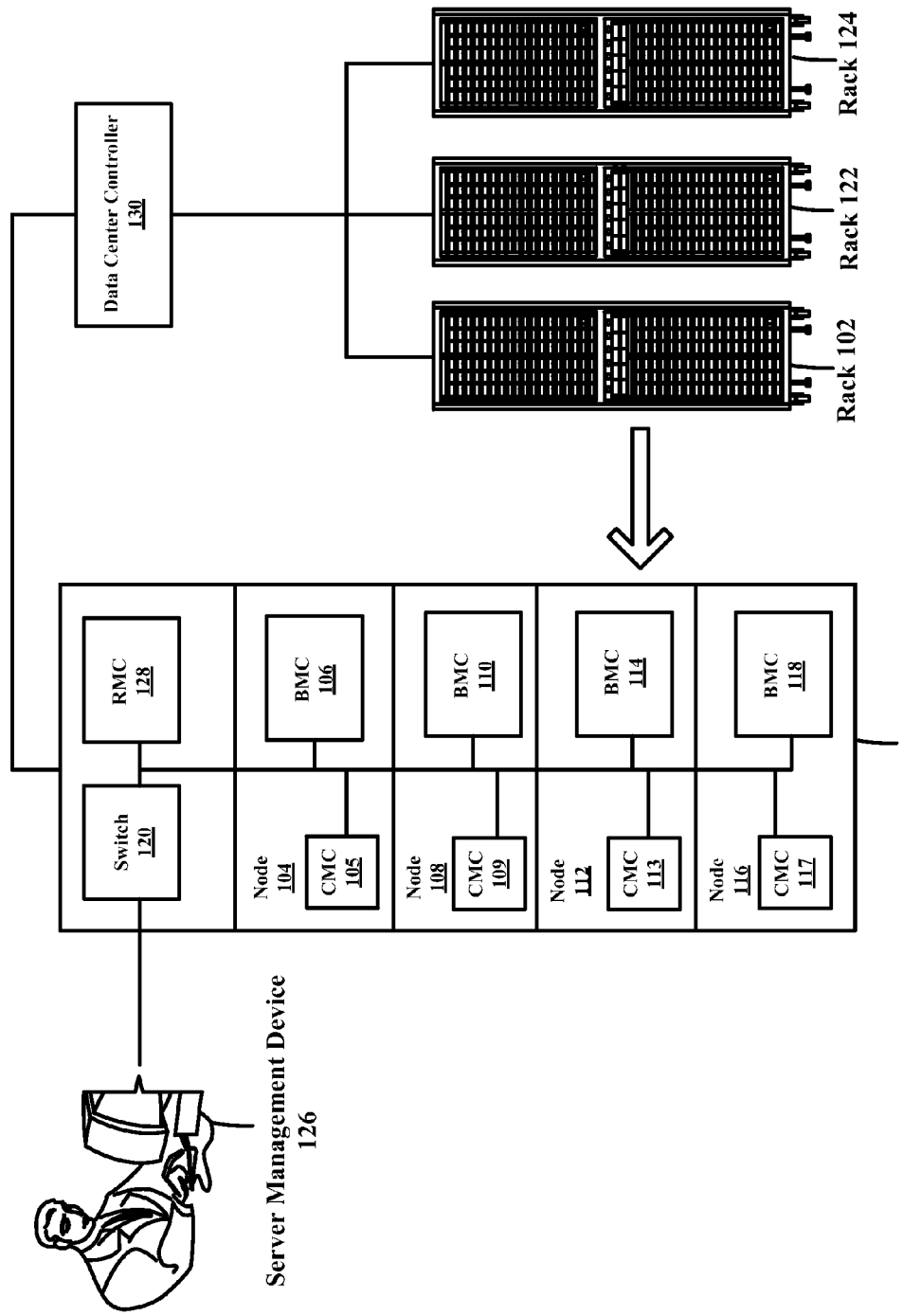
FIG. 1 illustrates an overall system diagram including a server rack and a server management device, according to some embodiments.

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Out-of-band management is widely adopted as a scalable and flexible management mechanism for data centers. Out-of-band management can use a dedicated channel for managing network devices. Using out-of-band management, a system administrator can use a server administration device (e.g. a computer) to monitor the operation status of a large number of servers through a network such as LAN. Further, it allows a system administrator to monitor and manage numerous servers and other devices by remote control regardless of whether or not a server or an operating system is functional. For example, out-of-band management can adjust BIOS (Basic Input/Output System) settings or monitor server's physical status such as temperature, voltage, and fan speed, etc.

Out-of-band management can be enabled by independent hardware such as a BMC and other service satellite controllers, as well as the corresponding operation interface such as IPMI. Typically, a server management device can communicate with the BMC and/or the RMC via RMCP over LAN.

RMCP, or RMCP+, is a specialized wire protocol for providing IPMI over LAN. To provide data security over the network, RMCP requires authentication and encryption mechanisms which can be complex and time consuming. In other words, to establish a communications session with the BMC via RMCP, the server management device needs to verify the requisite credential (e.g., a user name and a password) before communicating with the BMC. Accordingly, the complexity involved in managing a large number of BMCs is significantly increased by the required authentication mechanism. Moreover, performing even the simplest tasks for a large number of BMCs is challenging. For example, it is difficult to pool and update individual credentials for a large number of BMCs, thereby reducing efficiency in out-of-band management.

Thus, there is a need to improve the efficiency of out-of-band management by providing an optimized mechanism to configure and manage credentials for a large number of service controllers. Further, there is a need to modify various configurations for multiple service controllers using an efficient mechanism.

The present technology discloses techniques that can enable a RMC to configure multiple BMCs to be associated with the same configuration. According to some embodiments, a RMC can transmit a new credential to a group of BMCs by a system interface called Intelligent Platform Management Bus/Bridge (IPMB). According to some embodiments, a RMC can transmit a new configuration (e.g., a credential, a network setting, or a node operational setting) to a group of BMCs by IPMB.

As an enhanced implementation of $I^2C$, IPMB is a message-based, hardware-level basic interface specification. It is authentication-free since it is intended for trusted internal communications. Accordingly, a RMC can use IPMB to configure a large number of BMCs so that they can share a same credential or a same configuration for a convenient management by a server management device.

FIG. 1 illustrates an overall system diagram including multiple server racks and a server management device, according to some embodiments. It should be appreciated that the topology in FIG. 1 is an example, and any numbers of racks, controllers, switches and network components may be included in the system of FIG. 1.

According to some embodiments, an administrator can use a server management device 126 to remotely manage a large number of server racks (e.g., Rack 102, Rack 122 or Rack 124) via out-of-band management. For example, Rack 102 can include multiple nodes such as Node 104, 108, 112 and 116. According to their respective functions, these nodes can be storage nodes or computing nodes, or a combination of the two. These nodes can host different client applications, such as email or web applications. Further, they can transmit data via layers of switch fabrics that are built into the rack's architecture. For example, a Switch 120 can be built into a rack and provide network functions to all nodes in Rack 102. An example of Switch 120 can be a Top of Rack (TOR) switch that is typically placed on the top of a rack.

According to some embodiments, the system can utilize various service controllers at different management hierarchy levels to monitor and manage the numerous nodes in the system. For example, a Data Center Controller can manage data transmission between Rack 102, Rack 122 and Rack 124 using a dedicated network interface. For example, each chassis within Rack 102 can be associated with a Chassis Management Controller, (e.g., CMC 105, CMC 109, CMC 113 and CMC 117), each of which can manage data transmission within a chassis and manage all nodes within the chassis.

As shown in FIG. 1, each respective node can be associated with a service controller for managing its node data, which can comprise any node status-related data such as error messages, chassis internal temperature, voltages and fan speeds.

For example, BMC 106, 110, 114 and 118 can respectively manage each of Node 104, 108, 112 and 116. A BMC is an independent and embedded microcontroller that, in some embodiments, is responsible for the management and monitoring of peripheral devices, e.g., switches, computing nodes and storage nodes. According to some embodiments, a BMC can monitor the server's hardware components by receiving data from sensors installed in the chassis, e.g., fan speeds, CPU temperature, power consumption level, etc. A BMC can communicate with another BMC or a RMC via IPMB by using an I2C bus. A BMC can communicate with a server management device using RMCP using LAN.

According to some embodiments, RMC 128 can manage BMCs within Rack 102. Because a RMC can manage a group of BMCs, RMC 128 can be a primary service controller and the BMC can be a secondary service controller. For example, each of the BMCs and the RMC can communicate with Server Management Device 126 via, for example, RMCP or RMCP+ messages over LAN.

A RMC can aggregate network traffic within a server rack and communicate with a server management device, often via a switch. RMC 128, for example, can communicate with BMCs and Switch 120 via IPMB messages over I2C. Additionally, RMC 128 can communicate with other RMCs associated with other racks, e.g. Rack 122 or Rack 124 via LAN.

For example, when Node 104 is crashed or loses power, BMC 106 can remain functional since it has an independent power supply and operation system. Thus, by communicating with BMC 106, Server Management Device 126 can retrieve system error messages related to Node 104 for diagnosis purpose. Server Management Device 126 can connect to BMC 106, for example, via RMCP over LAN. It can monitor node status or obtain node data. Node data can comprise any node status-related data such as error message, chassis internal temperature, voltages and fan speeds for diagnosis purpose.

Conventionally, each service controller is configured to have individual default credentials, which can create difficulty in maintaining and updating these credentials for out-of-band management. For example, a BMC manufacture can provide a default and random user name/password for BMC 106. As such, to establish network communication with BMC 106 for managing node data of Node 104, Server Management Device 126 needs to possess information related to the default user name/password for BMC 106. Accordingly, in compliance to handle a different BMC (e.g., BMC 110), Server Management Device 126 needs to retrieve another user name and password separately.

According to some embodiments, RMC 128 can configure each of BMCs 106, 110, 114 and 118 so that they can share a same user name and password. It can provide an efficient credential management for Server Management Device 126. Further, as IPMB is intended for trusted internal communications and does not require authentication, RMC 128 can configure these BMCs without a complex authentication process.

According to some embodiments, RMC 128 can determine a selected group of BMC to be associated with the same user name and password based on, for example, segmentation data. Segmentation data can be previous user activity data, node ownership data, node usage data, or any appropriate data. For example, a selected group of secondary service controllers can be within the same rack or across multiple racks. For example, because BMC 106 and BMC 110 are related to client A, they can be assigned a first user name and a first password; because BMC 114 and BMC 118 are related to client B, they can be assigned a second user name and a second password. Accordingly, if the BMCs related to client C are housed in different racks, these BMCs can be assigned the same user name and password. It can thus provide optimized client node management.

Additionally, RMC 128 can configure each of BMCs 106, 110, 114 and 118 so that they can share a same configuration, such as a network configuration, or other types of node management configurations.

According to some embodiments, RMC 128 can receive a new credential from Server Management Device 126 via RMCP over LAN. Alternatively, RMC 128 can utilize Representational State Transfer (REST) over LAN, or other appropriate specification for wireless data transmission.

Figure 2:
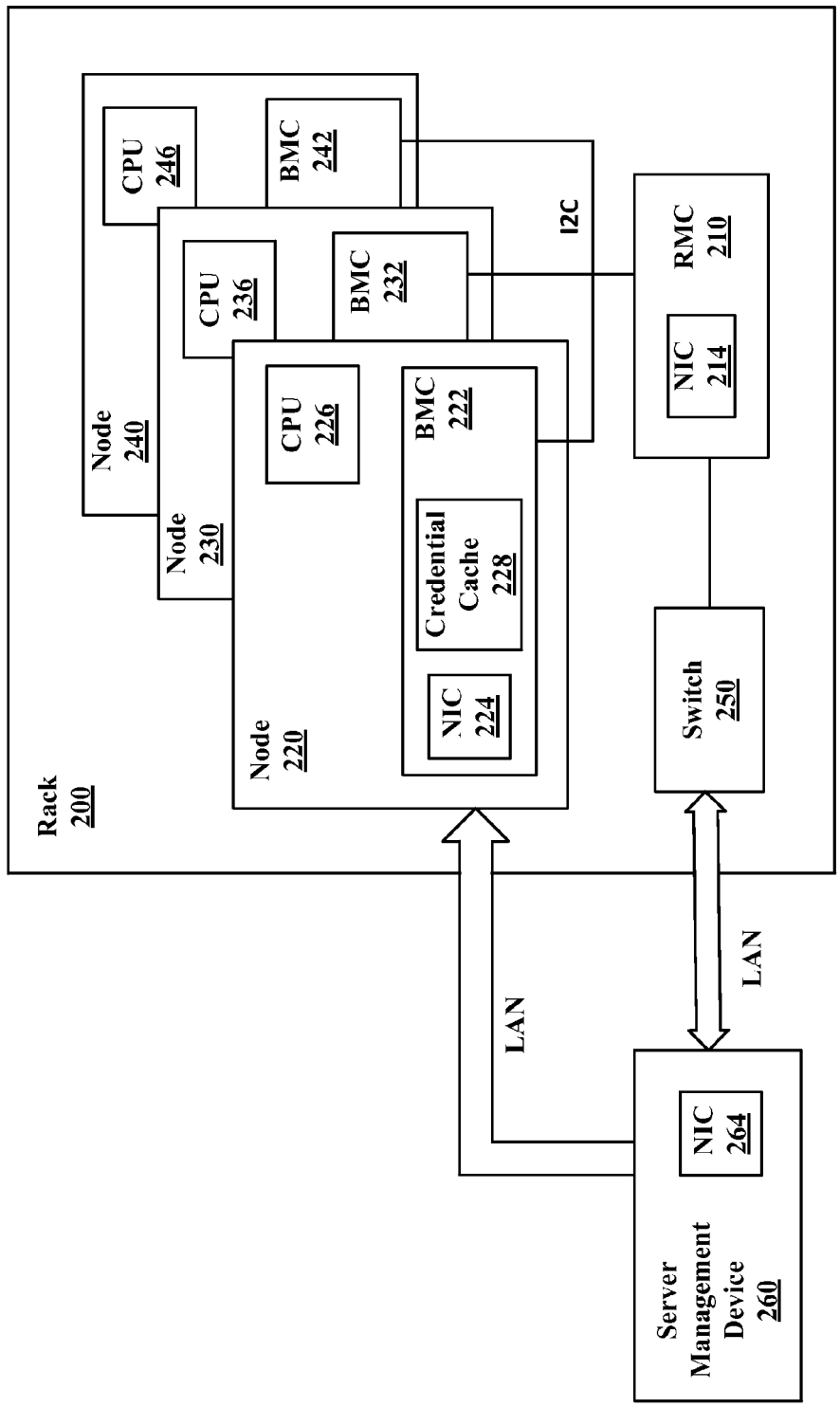
FIG. 2 is a schematic block diagram illustrating an example of an authentication-free configuration system for a group of service controllers, according to some embodiments.

FIG. 2 is a schematic block diagram illustrating an example of an authentication-free configuration system for a group of service controllers, according to some embodiments. As shown in FIG. 2, Rack 200 can at least comprise Switch 250 that can regulate network traffic for a group of nodes (e.g., Node 220, Node 230 and Node 240) using a dedicated network interface implemented by Network Interface Controller (NIC) 264.

According to some embodiments, each node can comprise a main CPU and a service controller that is independent form the main CPU. For example, Node 220 can include CPU 226 and its service controller BMC 222, which further comprises a dedicated NIC 224 and Credential Cache 228. NIC 224 can be assigned with a unique MAC address for network traffic routing. Similarly, Node 230 can comprise CPU 236 and its service controller BMC 232, which comprises a dedicated NIC (not shown) and a Credential Cache (not shown); Node 240 can comprise CPU 246 and its service controller 242 with a dedicated NIC (not shown) and a Credential Cache (not shown).

According to some embodiments, BMC 222 can be an embedded and independent microprocessor that has an operating system (e.g., IPMI) different from CPU 226 (e.g., LINUX). BMC 222 can have a power supply separate from CPU 226. According to some embodiments, BMC 222 can receive server performance data through numerous sensors (e.g. thermometer, power meter, etc.) and transmit these data to Server Management Device 260.

Further, each BMC is associated with a default credential (e.g. a user name and a password) for establishing data transmission between a BMC and a server management device via LAN. According to some embodiments, a BMC manufacture can configure a user name and a password and provide them to the BMC buyer. Additionally, one BMC can be associated with a different user name and password from another BMC.

According to some embodiments, Rack 200 can comprise RMC 210 for routing and managing data communications between the different nodes that are internal or external to Rack 200, often via LAN. RMC 210 can be an embedded and independent microprocessor that is designed to manage one or more chassis of Rack 200. According to some embodiments, a Server Management Device 260 can perform specific system functions such as pulling system update, change settings, or opening a remote console session, from RMC 210 interface, instead of the distributed BMC interfaces. Additionally, RMC 210 can enable backing up system settings or adjusting BIOS settings to Rack 210.

According to some embodiments, RMC 210 can receive a new credential (e.g., a new user name and password), for example, from Service Management Device 260. RMC 210 can further transmit the new credential to BMCs within Rack 200 to substitute one or more credentials. After receiving the new credential, each BMC (e.g., BMC 222 and BMC 232) can substitute its related credential with the new authentication credential. At a later point, each BMC can communicate with Server Management Device 260 after verifying the new credential, for example, by RMCP or REST over LAN.

According to some embodiments, RMC 210 can, for example, determine a selected group of BMCs to be associated with the new credential. Such determination can be based on for example, segmentation data provided by the node management device. Segmentation data can be previous user activity data, or user ownership data, or any appropriate data.

For example, as BMC 222 and BMC 232 are related to client A, they can be assigned a first user name and a first password; as BMC 242 is related to client B, they can be assigned a second user name and a second password. Accordingly, if the BMCs related to client C are housed in different racks, these BMCs can be assigned the same user name and password.

According to some embodiments, BMC 222 can receive a new credential (e.g., a new user name and a new password) transmitted from RMC 210 using a trusted and authentication-free system bus such as I2C. BMC 222 can further substitute a default credential with the new credential. BMC 22 can save the new credential in Credential Cache 228.

Then BMC 222 can receive a verification request to access node data related to Node 226 by Server Management Device 260. When the verification request comprises a credential that matches with the new credential, Server Management Device 260 is determined to have an access right to the node data. On the other hand, if the credential associated with the request is different from the new credential, Server Management Device 260 is denied to access the node data. After confirming an access right of Server Management Device 260, BMC 222 can then transmit the node data to Server Management Device 260 using, for example, RMCP over LAN. Further, node data can be any node status-related data including server error messages, chassis internal temperature, voltages and fan speeds.

Further, Server Management Device can adjust BIOS settings or monitor Node 220's physical status such as temperature, voltage, and fan speed, by communicating with BMC 222.

In addition to modifying default credentials of a group of service controllers, the authentication-free configuration system of FIG. 2 can modify other configurations of the group of service controllers using mechanisms disclosed herein.

Figure 3:
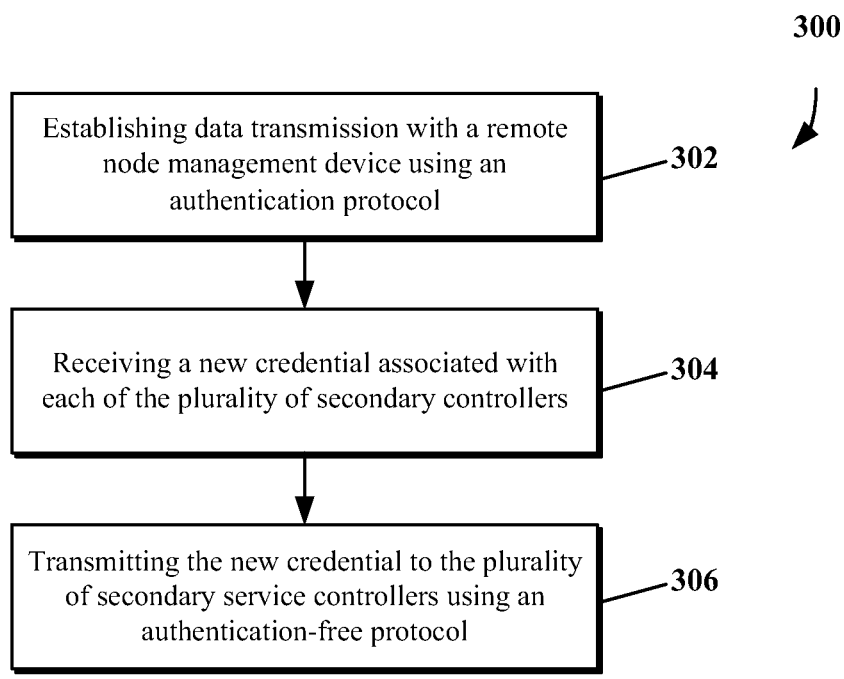
FIG. 3 is an example flow diagram for an authentication-free configuration system, according to some embodiments.

FIG. 3 is an example flow diagram for an authentication-free configuration system, according to some embodiments. It should be understood that there can be additional, fewer, or alternative steps performed in similar or alternative orders, or in parallel, within the scope of the various embodiments unless otherwise stated.

At step 302, a primary service controller can establish data transmission with a remote node management device using an authentication protocol. The primary service controller can be associated with a group of secondary service controllers. For example, as shown in FIG. 1, RMC 128 can establish an Ethernet link with Server Management Device 126, using a dedicated NIC. Additionally, the Ethernet link can require an authentication process for data transmission.

At step 304, the primary service controller can receive, using the authentication protocol, a new credential associated with each of the group of secondary service controllers. Further, each of the group of secondary service controller is configured to manage node data for one node of a group of nodes. For example, as shown in FIG. 1, RMC 128 can receive a new username and a password from Server Management Device 126, for BMC 106, 110, 114, and 118 via LAN. Additionally, RMC 128 can receive a new user name and a new password from Switch 120 (e.g., a TOR switch) that can receive the new user name and password from Server Management Device 126 via LAN.

Further, a primary service controller can determine a selected group of secondary service controllers for being configured with a new credential. According to some embodiments, such a determination can be partially based on segmentation data such as user's ownership of nodes, or user's previous activity data. For example, nodes and service controllers corresponding to client A can be assigned a same user name and password for efficient credential management.

At step 306, the primary service controller can transmit the new credential to the group of secondary service controllers, via an authentication-free system bus. For example, RMC 128 can transmit the new user name and password to all BMCs within a rack (e.g., BMC 106, 110, 114 and 118), using IPMB over I2C. After receiving the new user name and password, a BMC can modify a respective default user name and password to the new user name and password for communication with other network devices.

Figure 4:
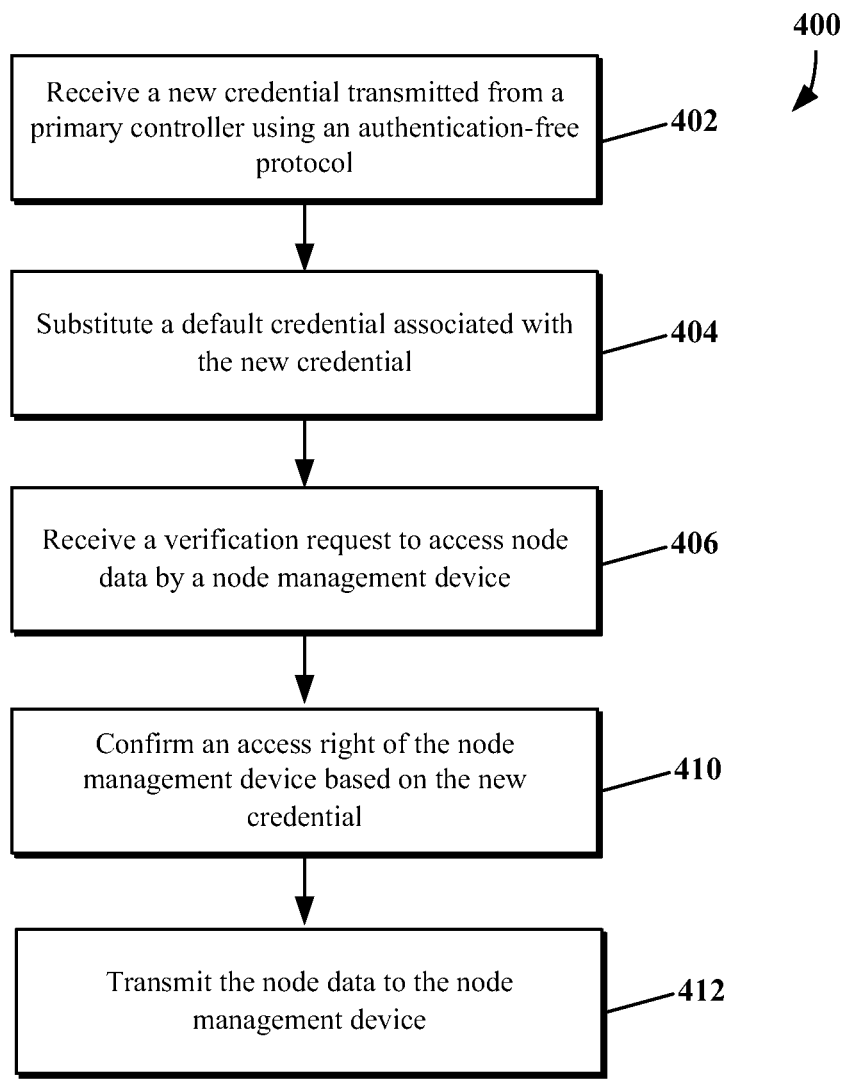
FIG. 4 is another example flow diagram for an authentication-free configuration system, according to some embodiments.

FIG. 4 is another example flow diagram for an authentication-free configuration system, according to some embodiments. It should be understood that there can be additional, fewer, or alternative steps performed in similar or alternative orders, or in parallel, within the scope of the various embodiments unless otherwise stated.

At step 402, a secondary controller can receive a new credential from a primary controller using an authentication-free system bus. For example, as shown in FIG. 1, BMC 106 can receive a credential from a RMC using IPMB over I2C.

At step 404, the secondary controller can substitute a default credential with the new credential. For example, BMC 106 can substitute a default credential with the new credential provided by IPMB over I2C.

At step 406, the secondary controller can receive a verification request from a node management device to access node data. For example, BMC 106 can receive a request from Server Management Device 126 for accessing node data, by a dedicated network interface implemented by a NIC of the BMC. According to some embodiments, the request can be transmitted via Switch 120 associated with BMC 106.

At step 408, the secondary controller can confirm an access right of the node management device based on the new credential. For example, if the request from Server Management Device 126 comprises a credential that matches with the new credential, Server Management Device 126 is determined to have an access right to the node data. On the other hand, if the credential associated with the request is different from the new credential, Server Management Device 126 is denied to have an access to the node data.

At step 410, the secondary controller can transmit the node data to the node management device. For example, BMC 106 can transmit node data associated with a node it manages to a node management device via LAN. BMC 106 can also receive node management commands, e.g. BIOS commands, from Server Management Device 126 to manage operations of Node 104.

Figure 5:
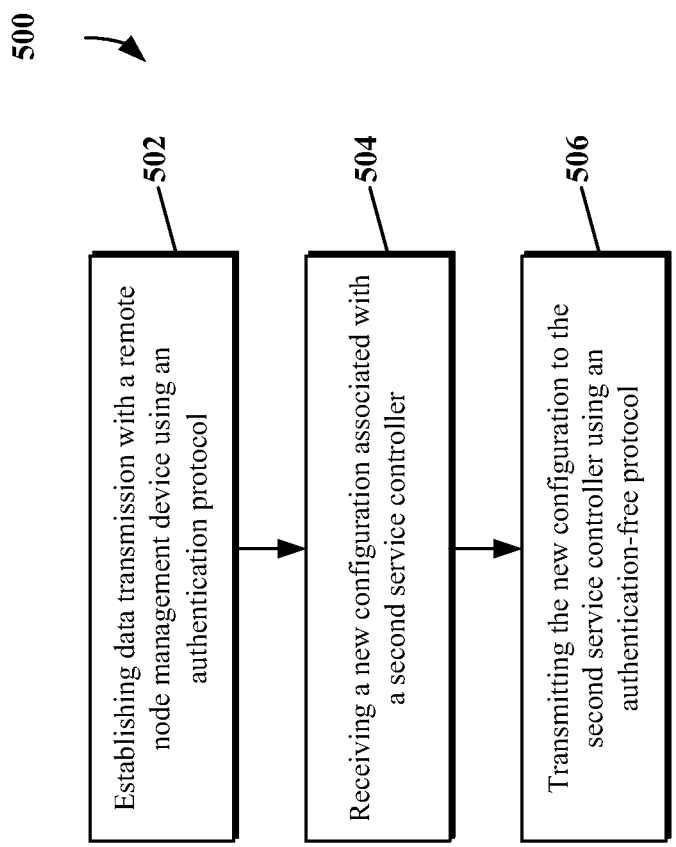
FIG. 5 is yet another example flow diagram for an authentication-free configuration system, according to some embodiments.

FIG. 5 is an example flow diagram for an authentication-free configuration system, according to some embodiments. It should be understood that there can be additional, fewer, or alternative steps performed in similar or alternative orders, or in parallel, within the scope of the various embodiments unless otherwise stated.

At step 502, a first service controller can establish data transmission with a remote node management device using an authentication protocol. The first service controller can be associated with a second service controller. For example, as shown in FIG. 1, RMC 128 can establish an Ethernet link with Server Management Device 126, using a dedicated NIC. Additionally, the Ethernet link can require an authentication process for data transmission.

At step 504, the first service controller can receive, using the authentication protocol, a new configuration associated with the second service controller. Further, the second service controller is configured to manage node data a node. For example, as shown in FIG. 1, RMC 128 can receive a new configuration from Server Management Device 126, for BMC 106, via LAN. Additionally, RMC 128 can receive a new configuration from Switch 120 (e.g., a TOR switch) that can receive the new configuration from Server Management Device 126 via LAN.

At step 506, the first service controller can transmit the new configuration to the second service controller, via an authentication-free system bus. For example, RMC 128 can transmit the new configuration to BMC 106, using IPMB over I2C. After receiving the new configuration, BMC 106 can modify a respective default configuration to the new configuration.

Figure 6:
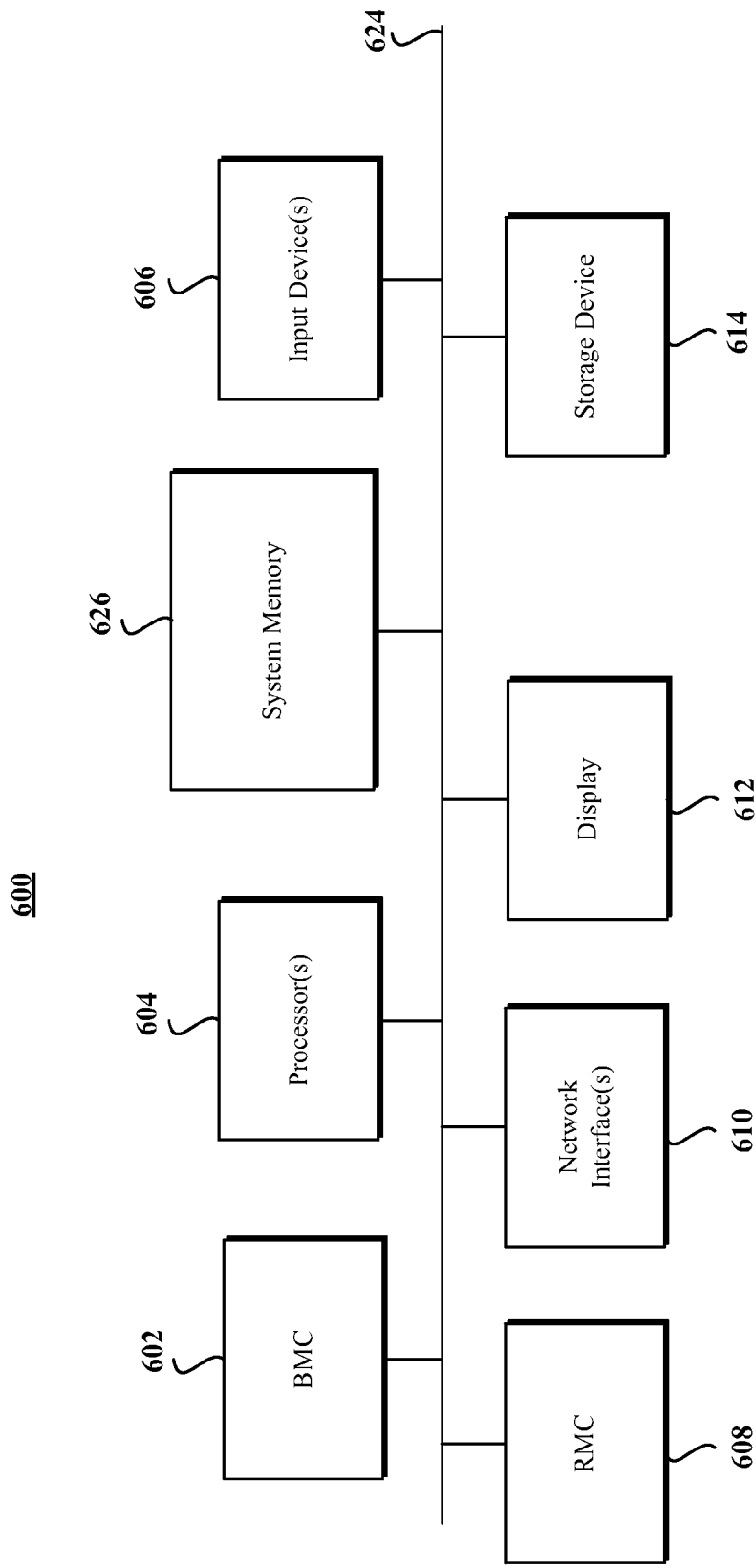
FIG. 6 illustrates a computing platform of a computing device, according to some embodiments.

FIG. 6 illustrates an example system architecture 600 for implementing the systems and processes of FIGS. 1-5. Computing platform 600 includes a bus 624 which interconnects subsystems and devices, such as: BMC 602, processor 604, storage device 614, system memory 626, a network interface(s) 610, and RMC 608. Processor 604 can be implemented with one or more central processing units ("CPUs"), such as those manufactured by Intel® Corporation—or one or more virtual processors—as well as any combination of CPUs and virtual processors. Computing platform 600 exchanges data representing inputs and outputs via input-and-output devices input devices 606 and display 612, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 600 performs specific operations by processor 604, executing one or more sequences of one or more instructions stored in system memory 626. Computing platform 600 can be implemented as a server device or client device in a client-server arrangement, peer-to-peer arrangement, or as any mobile computing device, including smart phones and the like. Such instructions or data may be read into system memory 626 from another computer readable medium, such as storage device 614. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including, but not limited to, non-volatile media and volatile media. Non-volatile media includes, for example, optical or magnetic disks and the like. Volatile media includes dynamic memory, such as system memory 626.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 524 for transmitting a computer data signal.

In the example shown, system memory 526 can include various modules that include executable instructions to implement functionalities described herein. In the example shown, system memory 526 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
    establishing, at a primary service controller, data transmission with a remote node management device using an authentication protocol, the primary service controller being associated with a plurality of secondary service controllers;
    receiving, using the authentication protocol, a new credential associated with each of the plurality of secondary service controllers, the plurality of secondary service controllers configured to manage node data of a plurality of nodes; and
    transmitting, via an Inter-Integrated Circuit (I2C), the new credential to the plurality of secondary service controllers using an Intelligent Platform Management Interface (IPMI) message, the plurality of secondary service controllers configured to substitute a respective credential using the new credential,
    wherein the plurality of secondary service controllers is configured to communicate with the remote node management device using the new credential, and
    wherein the primary service controller comprises one of a Rack Management Controller, a Chassis Management Controller or a Data Center Management Controller, and wherein the secondary service controller comprises a Baseboard Management Controller.

2. The computer-implemented method of claim 1, further comprising:
    determining a plurality of secondary service controllers associated with the new credential based at least in part on segmentation data.

3. The computer-implemented method of claim 2, wherein the segmentation data comprises at least one of node ownership data, previous user activity data, or node usage data.

4. The computer-implemented method of claim 1, wherein the authentication protocol is Ethernet.

5. The computer-implemented method of claim 1, wherein the node management device is further configured to transmit at least a portion of node data associated with the plurality of secondary service controllers.

6. The computer-implemented method of claim 1, wherein the node management device is further configured to manage the plurality of nodes by communicating with the plurality of secondary service controllers.

7. The computer-implemented method of claim 1, wherein the respective credential associated with the each one of a plurality of secondary controllers is different from each other.

8. The computer-implemented method of claim 1, wherein the respective credential includes a default user name and a default password, and wherein the new credential includes a customized user name and a customized password provided.

9. A non-transitory computer-readable storage medium storing instructions, the instructions when executed by a processor causing the processor to:
    establish, at a first service controller, data transmission with a remote node management device using an authentication protocol, the first service controller being associated with a second service controller;
    receive, using the authentication protocol, a new configuration associated with the second service controller, the second service controller configured to manage node data of a node; and transmit, via an Inter-Integrated Circuit (I2C), the new configuration to the second service controller using an Intelligent Platform Management Interface (IPMI) message, the second service controller configured to substitute a respective configuration with the new configuration, wherein the first service controller comprises one of a Rack Management Controller, a Chassis Management Controller or a Data Center Management Controller, and wherein the secondary service controller comprises a Baseboard Management Controller.

10. The non-transitory computer-readable storage medium of claim 9, wherein the authentication protocol is Ethernet.

11. The non-transitory computer-readable storage medium of claim 9, wherein the node management device is configured to transmit at least a portion of node data associated with the second service controller, and wherein the node management device is further configured to manage the node by communicating with the second service controller.

12. The non-transitory computer-readable storage medium of claim 11, wherein the new configuration comprises at least one of a user name and a password, a network configuration, or a general controller configuration.

13. The non-transitory computer-readable storage medium of claim 9, wherein the second controller is configured to manage node data of the node.

* * * * *